United States Patent Office 3,525,778
Patented Aug. 25, 1970

3,525,778
ORGANOPHOSPHATOSTANNANES AND CURABLE ORGANOPOLYSILOXANE COMPOSITIONS CONTAINING THE SAME
Guenther Fritz Lengnick, Manitou Beach, Mich., assignor to Stauffer Chemical Company, New York, N.Y., a corporation of Delaware
No Drawing. Filed Feb. 27, 1968, Ser. No. 708,501
Int. Cl. *C07f 7/22; C08f 11/04; C08g 31/14*
U.S. Cl. 260—825         10 Claims

ABSTRACT OF THE DISCLOSURE

Organophosphatostannanes of the formula:

in which Y represents halogen, OR'', or

R and R' are organic groups; R'' is an alkyl or aryl group; $m$ is an integer of from 0 to 2; $n$ is an integer greater than 0; and the sum of $m$ and $n$ is less than 4 and their use as curing catalysts for organopolysiloxanes are described herein.

---

This invention relates to organophosphatostannanes, particularly to curable organopolysiloxanes containing organophosphatostannanes and more particularly to organopolysiloxane compositions having variable curing times.

Heretofore, organotin catalysts, such as dibutyltin butoxychloride, dibutyltin dilaurate, and the like, have been used to accelerate the curing of organopolysiloxanes. However, it was found that these catalysts do not provide a satisfactory rate of cure for some applications. In addition, it was found that in some commercial applications, it is desirable to have a rapid cure rate, while in other commercial applications it is desirable to have a slow cure rate. Obviously, there has been a need in the prior art for curable organopolysiloxane compositions having variable curing times, depending upon the commercial application.

It is therefore an object of this invention to prepare organophosphatostannanes. Another object of this invention is to provide an improved curing catalyst for silicone elastomers. Still another object of this invention is to provide organopolysiloxane compositions having variable curing times. A further object of this invention is to provide organopolysiloxane compositions which are curable in ambient moisture. A still further object of this invention is to provide a catalyst which may be incorporated in one- and two-component systems to provide variable curing times.

The foregoing objects and others which will become apparent from the following description are accomplished in accordance with this invention, generally speaking, by incorporating in a curable organopolysiloxane composition a catalyst represented by the formula:

in which Y represents halogen, OR'', or

R and R' are organic groups; R'' is an alkyl or aryl group; $m$ is an integer of from 0 to 2; $n$ is an integer greater than 0; and the sum of $m$ and $n$ is less than 4.

In the above formula, R may represent alkyl radicals having from 1 to 18 carbon atoms, such as methyl, ethyl, propyl, butyl, hexyl, octyl, decyl, dodecyl, tetradecyl, and octadecyl; aryl radicals, such as phenyl, diphenyl, naphthyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl; alkenyl radicals, such as vinyl, allyl, and the like. R' may represent alkyl radicals having from 1 to 10 carbon atoms, such as methyl, propyl, butyl, hexyl, octyl, decyl; aryl radicals, such as phenyl, diphenyl, naphthyl; haloalkyl radicals, such as chloromethyl, dichloromethyl, chloroethyl, 1-chloropropyl, 1-chlorobutyl, and the like. R'' may also represent alkyl radicals having from 1 to 10 carbon atoms, such as ethyl, butyl, hexyl, octyl, decyl, or aryl radicals, such as phenyl, diphenyl, naphthyl, and the like.

Examples of compounds embraced by the above formulas are dibutylbis(diethylphosphato)stannane,
dimethylbis(dimethylphosphato)stannane,
dihexylbis(dipropylphosphato)stannane,
dioctylbis(ethylmethylphosphato)stannane,
didodecylbis(dibutylphosphato)stannane,
ditetradecylbis(dihexylphosphato)stannane,
dioctadecylbis(diethylphosphato)stannane,
butylmethoxybis(dimethylphosphato)stannane,
methylethoxybis(diethylphosphato)stannane,
hexylpropoxybis(dipropylphosphato)stannane,
octylbutoxybis(methylethylphosphato)stannane
tridecyloctoxybis(methylbutylphosphato)stannane,
methyldimethoxydimethylphosphatostannane,
methyldiethoxydiethylphosphatostannane,
ethyldibutoxydiethylphosphatostannane,
propyldihexoxydipropylphosphatostannane,
diphenylbis(diethylphosphato)stannane,
phenylmethoxybis(diethylphosphato)stannane,
cumylmethoxybis(diethylphosphato)stannane,
myristylbutoxybis(dibutylphosphato)stannane,
styrylmethoxybis(diethylphosphato)stannane,
vinyltris(diethylphosphato)stannane,
vinylmethoxybis(dimethylphosphato)stannane,
allylethoxybis(dipropylphosphato)stannane,
1-propenylethoxybis(diethylphosphato)stannane,
2-butenylmethoxybis(dibutylphosphato)stannane,
1,3-butadienylmethylbis(dimethylphosphato)stannane,
2-pentenylmethoxybis(dihexylphosphato)stannane,
vinyltris(dimethylphosphato)stannane,
allyltris(diethylphosphato)stannane,
butyltris(dihexylphosphato)stannane,
octyltris(dipropylphosphato)stannane,
phenethyltris(dimethylphosphato)stannane,
chloromethyltris(diethylphosphato)stannane,
butylbis(diethylphosphato)chlorostannane,
octylbis(dipropylphosphato)chlorostannane,
phenylbis(dimethylphosphato)chlorostannane,
butylbis(diethylphosphato)fluorostannane,
cumylbis(diethylphosphato)chlorostannane, and the like.

The stannanes may be prepared by reacting at an elevated temperature compounds of the formula:

with phosphates of the formula:

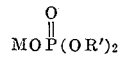

in which X represents halogen or OR'' groups; M is hydrogen or a metal, preferably an alkali metal or alkaline earth metal; and R, R', R'', Y, $m$ and $n$ are the same as those represented above. Although it is not essential, it is preferred that the above reaction be carried out in the presence of an inert organic solvent. Examples of suitable solvents are aromatic hydrocarbons, such as benzene, toluene, xylene, naphthas; aliphatic hydrocarbons, such as hexane, heptane, octane; halogenated aliphatic hydrocarbons, such as methylene chloride and carbon tetrachloride. Other solvents which may be used are dialkyl ethers, such as dibutyl ether, methyl butyl ether, dihexyl ether, and the like.

These catalysts may be incorporated in slow curing one-component and two-component room temperature vulcanizing systems containing organopolysiloxanes or modified organopolysiloxanes. The one-component system may be represented by the formula:

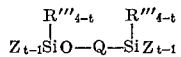

wherein the R'''s), which may be the same or different, are monovalent hydrocarbon radicals, halogenated monovalent hydrocarbon radicals, or cyanoalkyl radicals; Q represents an organopolysiloxane having recurring structural units of the formula:

or modified organopolysiloxanes having the formula:

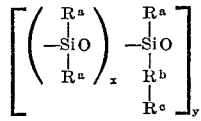

wherein $R^a$, which may be the same or different, represents monovalent hydrocarbon radicals, halogenated monovalent hydrocarbon radicals, or cyanoalkyl radicals; $R^b$ is a divalent hydrocarbon radical; $R^c$ is a polymeric organic radical linked to $R^b$ by a carbon-to-carbon linkage; Z is a radical hydrolyzable by ambient moisture; $t$ is an integer greater than 2; $x$ is an integer of from 0 to 20,000; and $y$ is an integer of from 1 to 500.

In the above formula, the R'''s are organic groups selected from the class consisting of alkyl radicals having from 1 to 18 carbon atoms, such as methyl, ethyl, butyl, hexyl, octyl, decyl, dodecyl, tetradecyl, octadecyl; aryl radicals, such as phenyl, diphenyl, naphthyl, and the like; alkaryl radicals, such as tolyl, xylyl, ethylphenyl, and the like; aralkyl radicals, such as benzyl, phenethyl, and the like; haloaryl radicals, such as chlorophenyl, tetrachlorophenyl, difluorophenyl, and the like; alkenyl radicals, such as vinyl, allyl, and the like. $R^a$, which may be the same or different, may be the same as R''' above; $R^b$ is a divalent hydrocarbon radical having from 1 to 12 carbon atoms, such as ethylene, trimethylene, tetramethylene, hexamethylene, octamethylene, dodecylmethylene, and the like. $R^c$ is a polymer or copolymer linked to the organopolysiloxane through a carbon-to-carbon linkage with the divalent hydrocarbon radicals represented by $R^b$ above. Z represents hydroxyl groups or groups which are hydrolyzable by ambient moisture such as Carboxy, OOCR''''
Carbonoxy, OR''''
Aminooxy, —ON(R'''')$_2$
Oximo, —ON=C(R'''')$_2$ or

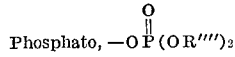

radicals. R'''', which may be the same or different, represents monovalent hydrocarbon radicals and halogenated monovalent hydrocarbon radicals. Examples of carboxy radicals are monoacyl radicals of carboxylic acids, such as acetoxy, propionyloxy, valeryloxy, caproyloxy, myristoyloxy, stearoyloxy, and the like. Other hydrolyzable groups are carbonoxy radicals having from 1 to 10 carbon atoms, such as methoxy, butoxy, octoxy, decoxy, phenoxy, and the like. Examples of aminooxy radicals are dimethylaminooxy, diethylaminooxy, dipropylaminooxy, dibutylaminooxy, dioctylaminooxy, diphenylaminooxy, ethylmethylaminooxy, methylphenylaminooxy, and the like. Suitable oximo groups are acetophenoximo, acetoximo, benzophenoximo, 2 - butanoximo, isopropylketoximo, chlorocyclohexanoximo, alpha - bromoacetophenoximo, and the like. Examples of suitable phosphato radicals are dimethylphosphato, diethylphosphato, dipropylphosphato, dibutylphosphato, dihexylphosphato, dioctylphosphato, didodecylphosphato, dioctamethylhexylphosphato, butylhexylphosphato, methyldodecylphosphato, methyloctadecylphosphato, ethyltetradecylphosphato, diphenylphosphato, methylphenylphosphato, butylphenylphosphato, and the like.

The term "modified organopolysiloxane" is meant to include combinations of an organopolysiloxane (silicone) polymer with an organic polymer, in which part or all of the organic polymer is connected to the silicone polymer by a carbon-to-carbon linkage.

The modified organopolysiloxanes consists of silicone polymers having attached thereto one or more side chains or branches consisting of a carbon-chain polymer. In preparing these compounds, hydrogen is abstracted from the organosilicone polymer by a free-radical initiator to form an active site for grafting the organic polymer thereto.

Any silicone polymer may be used in this invention since these polymers are apparently capable of producing some free radicals or active sites under the proper conditions. Thus, the silicone polymer should be one which is capable of producing a substantial and recognizable number of free radicals, and it should be substantially free of any tendency to undergo further polymerization under the conditions employed. Thus, the silicone polymer should be one which is substantially free of any aliphatic unsaturation; however, a low degree of any such unsaturation does not preclude the desired reaction. Preferably, the silicone polymer has lower alkyl radicals attached to the silicon atoms since these are more amenable to hydrogen abstraction than other radicals. In addition, it is generally advisable to use silicone polymers which are substantially free of silicon-bonded hydrogen.

Examples of suitable silicone polymers and copolymers which may be used in the formation of grafted organopolysiloxanes are hydroxyl-terminated siloxane fluids, such as dimethyl fluids, methyl phenyl fluids, copolymers of dimethylsiloxane, and phenyl-, methyl-, or diphenylsiloxane units.

In addition, the silicone polymer may be in the form of partially hydrolyzed silanes containing residual hydrolyzable or condensable groups, such as silanols, salts of silanols, and partially condensed polysiloxanes.

Any polymerizable organic monomer having aliphatic olefinic bonds may be grafted to the silicone polymer. Examples of suitable olefinic compounds are low molecular weight straight-chain hydrocarbons, such as ethylene, propylene, butylene; vinyl halides, such as vinyl chloride and vinyl fluoride; vinyl esters of organic acids, such as vinyl acetate; styrene, ring-substituted styrenes, and other vinyl aromatics, such as vinylpyridine and vinylnaphthalene; acrylic acid and derivatives of acrylic acid, including the salts, esters, amides, and acrylonitrile; N-vinyl compounds, such as N-vinylcarbazole, N-vinylpyrrolidone, and N-vinylcaprolactam; and vinyl silicon compounds, such as vinyltriethoxysilane.

Disubstituted ethylenes of the type $CH_2=CX_2$ may be used, including vinylidene fluoride, vinylidene chloride, vinylidene cyanide, methacrylic acid, and compounds derived therefrom, such as the salts, esters, and amides, as well as methacrolein, methacrylonitrile, and the like.

Examples of disubstituted ethylenes of the type $CHX=CHX$, such as vinylene carbonate and various monomers which polymerize best in the presence of other monomers, e.g. maleic anhydride, esters of maleic and fumaric acids, stilbene, indene, and coumarone, may be used in the formation of these graft polymers.

The monomers may be used singly or in combinations of two or three or even more. The properties of the modified product, of course, depend on the nature and identity of the monomer material, as well as on the amounts used relative to the organopolysiloxanes.

The grafting operation is most expeditiously effected by using a free-radical initiator, normally organic peroxides, although other free-radical initiators, such as azo-compounds, in with both the N atoms of the azo linkage are attached to a tertiary carbon atom and the remaining valences of the tertiary carbon atom are satisfied by nitrile, carboxylalkyl, cycloalkylene, or alkyl radicals, preferably having from 1 to 18 carbon atoms. In addition to the above mentioned initiators, ionizing radiation may also be used to bring about the formation of free radicals.

Examples of suitable peroxides which are operative in this invention are hydroperoxides, such as t-butyl hydroperoxide, cumene hydroperoxide, decalin hydroperoxide; dialkyl peroxides, such as di-t-butyl and dicumyl peroxide; cyclic peroxides, such as ascaridole and 1,5-dimethylhexane-1,5-peroxide, and peresters, such as t-butyl perbenzoate, t-butyl peroxyisopropylcarbonate, and t-butyl peroctoate; ketone peroxides, such as acetone peroxide and cyclohexanone peroxide, are also applicable.

The amount of free-radical initiator employed is not critical, thus any amount capable of producing a perceptible degree of grafting is suitable. Generally, as little as 0.05 percent of the more active peroxide initiators based on the weight of the monomer is adequate in most cases. However, where it is desirable to increase the reaction rate, then as much as 3 percent or even more of the initiator may be used.

If desired, the unreacted monomers may be separated from the grafted product by any conventional technique known in the art, such as by distillation, solvent extraction, or selective solvent fractionation.

In the one-component system, hydroxyl-terminated organopolysiloxanes or modified organopolysiloxanes may be reacted with silanes of the formula:

$$R''' SiZ_t$$

wherein $R'''$, $Z$ and $t$ are the same as those represented above, in a ratio of at least 1 mole of the silane per mole of silicon-bonded hydroxyl group at a temperature ranging from about 20° C. to about 100° C. Higher or lower temperatures may be used, if desired, although it is preferred that the reaction be carried out at temperatures below about 200° C.

The organopolysiloxanes having functional groups on the terminal silicon atoms may be cured by merely exposing them to moisture in the atmosphere or in the presence of additional water vapor at room temperature. Upon exposure to moisture, crosslinking of the composition occurs at times varying from a few minutes up to several hours, depending upon the type of hydrolyzing group and the substituents present on the phosphatostannane catalyst.

In order to obtain a satisfactory cure in the two-component system, the phosphatostannane catalysts are incorporated in a composition comprising a cross-linking agent and an organopolysiloxane, preferably a hydroxyl-terminated organopolysiloxane having the formulae:

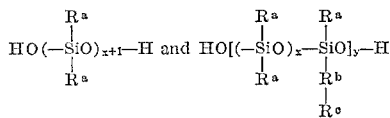

wherein $R^a$, $R^b$, $R^c$, $x$ and $y$ are the same as those mentioned above.

These organopolysiloxanes may be cross-linked with polyalkoxysilanes of the formula:

$$(R^dO)_zSi(R^e)_{4-z}$$

or polyalkoxysiloxanes in which the silicon atoms are linked through Si-O-Si bonds, and the remaining valences of the silicon atom are satisfied by $R^dO$ and/or $R^e$.

In the above formula, groups represented by $R^d$ are monovalent hydrocarbon radicals having less than 8 carbon atoms, while those represented by $R^e$ are monovalent hydrocarbon radicals or halogenated hydrocarbon radicals of less than 8 carbon atoms, and $z$ has a value of from 3 to 4. Examples of monovalent hydrocarbon radicals represented by $R^d$ are methyl, propyl, butyl, hexyl, octyl, phenyl, vinyl, allyl, ethylallyl, butadienyl, and the like. The radicals represented by $R^e$ may be the same as the radicals represented by $R^d$, as well as the corresponding halogenated groups, such as chloromethyl, 2-bromo-4,6-diiodophenyl, 1,2-difluorovinyl, 3,4-difluorocyclopentyl, 2-bromocyclopentene-2,3-yl, and 6-chlorohexyl. The polyalkoxysilanes employed herein include monoorganotrihydrocarbonoxysilanes, tetrahydrocarbonoxysilanes, e.g., orthosilicates and partial hydrolyzates of such silanes. The polyalkoxy compounds, e.g., ethyl orthosilicate or partially hydrolyzed ethyl silicate, such as ethyl silicate "40" which consists primarily of decaethyl tetrasilicate, are representative of these compounds. Examples of other operative alkyl silicates are ethyltrimethoxysilane, methylbutoxydiethoxysilane, propyltripropoxysilane, methyltriethoxysilane, ethyltriethoxysilane, ethyl orthosilicate, and butyl orthosilicate. Examples of alkylpolysilicates are ethylpolysilicate, isopropylpolysilicate, butylpolysilicate, dimethyltetraethoxydisiloxane, trimethylpentabutoxydisiloxane, and the like.

The polyalkoxysilanes and polyalkoxysiloxanes employed herein may be used either alone or in combination. They should be used in a proportion of from about 0.5 to about 10 percent, preferably from about 1 to 5 percent by weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced. However, a large excess of cross-linking agent insures complete reaction with all silicon-bonded hydroxyl groups and in addition, acts as a scavenger for any moisture which may be present.

The curing of these organopolysiloxane compositions is brought about by mixing the hydroxyl-terminated polysiloxanes with polyalkoxysilane or -siloxane cross-linking agents in the presence of the phosphatostannane catalysts of this invention. These catalysts may be dispersed in an inert solvent and then added to the polysiloxane composition, or they may be dispersed on a filler and thereafter milled with the organopolysiloxane. Examples of suitable hydrocarbon solvents are benzene, toluene, xylene, and the like; halogenated hydrocarbons, such as perchloroethylene or chlorobenzene; organic ethers, such as di-butyl ether and the like or fluid hydroxyl-free polysiloxanes. It is preferred that the solvents be of sufficient volatility to vaporize off at a very low temperature.

The phosphatostannanes used in the curing of these organopolysiloxanes are effective in minimal amounts, e.g., from about 0.05 to about 2 percent, preferably from about 0.1 to about 1 percent by weight based on the weight of the composition. A mixture of two or more of the above phosphatostannane compounds may be used as catalysts in order to provide variable curing times. As mentioned previously, these phosphatostannane catalysts may be added to the organopolysiloxane or, for convenience, they may be first incorporated in a carrier, such as a liquid or comminuted solid, or they may be added to both solid and liquid components. Generally, the carrier is inert but in some cases it may be functional.

The amount of catalyst added to the base composition is determined primarily by the requirements of the particular job, especially the pot life or working time required.

In caulking, for example, the working time is more or less conveniently calculated as of the order of from about 1 to 2 hours. Thus, in this instance, the catalyst is added in an amount which will not result in any substantial stiffening of the silicone composition until after expiration of such period of time. Normally, the composition is tack-free within 2 to 4 hours following the caulking operation and is substantially cured after about 24 hours and completely cured after about 7 days. These periods, of course, vary somewhat with change in humidity and temperature conditions. Thus, a faster cure results under conditions of high temperature and high humidity.

Although it is not essential, oftentimes it is desirable to incorporate fillers in these compositions in order to impart desirable physical properties. Examples of suitable fillers are fumed silicas, high surface-area-precipitated silicas, silica aerogels, as well as coarser silicas, such as diatomaceous earth, crushed quartz, and the like. Other fillers which may be used are metallic oxides, such as titanium oxide, ferric oxide, zinc oxide, and fibrous fillers, such as asbestos, fibrous glass, and the like. Other additives, such as pigments, antioxidants, ultraviolet absorbents, and the like, may be included in these compositions.

Even though the particle size of the filler and additive is not critical, it is preferred that they range from about 0.1 millimicrons up to about 2 millimicrons in diameter. Particles of larger diameter may be used; however, they may be more difficult to incorporate in the composition.

The organopolysiloxanes may be compounded in the usual manner for preparing conventional siloxane elastomers; however, where the materials are stored prior to use, it is essential that the phosphatostannane catalysts or cross-linking agents, such as polyalkoxysilane or polyalkoxysiloxane, be stored separately. In other words, the hydroxyl-terminated polysiloxanes, filler, and cross-linking agent may be compounded and the stannane catalyst added just prior to use. In another method, the polysiloxane, filler, and catalyst may be compounded and then the cross-linking agent added just prior to use. If an inert filler is used, it may be added either to the hydroxyl-terminated organopolysiloxane or the cross-linking agent prior to the addition of the catalyst or immediately after the reactants have been combined. The composition will cure spontaneously at room temperature upon mixing the ingredients, i.e., the organopolysiloxane catalyst, cross-linking agent, and filler, if desired.

The phosphatostannane catalysts of this invention will produce a tack-free surface ranging from a few minutes up to several hours, depending upon the type and concentration of catalyst. In addition, mixtures of the catalysts containing various substituents on the tin atom will accelerate the curing time of the entire exposed section. Thus, a complete cure which generally takes from 3 to 7 days without a catalyst may be effected in as little as about 30 minutes with the catalyst described herein when applied in the proper concentration. The use of these phosphatostannane catalysts in one- and two-component systems, such as described above, is as previously noted without precedent in the art.

The catalysts described herein may be used in room temperature vulcanizing compositions to produce variable curing times. These compositions may be used in connection with dental impressions, sealants between adjacent sections of highway, insulation material for electrical components, gaskets, adhesives, and the like.

Various embodiments of this invention are further illustrated in the following examples in which all parts are by weight unless otherwise specified.

EXAMPLE 1

To a reactor containing about 19 parts of dibutyldibutoxystannane and about 50 parts of toluene is added about 7.7 parts of diethyl hydrogen phosphate in about 10 parts of toluene. After refluxing the reaction mass for about 3 hours, the reactor is evacuated and the solvent removed by vacuum distillation. The temperature of the reactants is maintained at about 80° C. during the vacuum distillation. A translucent liquid product is obtained which is identified as dibutylbutoxy(diethylphosphato)stannane.

EXAMPLE 2

In accordance with the procedure described in Example 1, 15.5 parts of diethyl hydrogen phosphate in about 10 parts of toluene is added to about 19 parts of dibutyldibutoxystannane in about 50 parts of toluene. A viscous, translucent, brown liquid is obtained which is identified as dibutylbis(diethylphosphato)stannane.

EXAMPLE 3

Approximately 29.5 parts of dibutyldimethoxystannane in about 100 parts of benzene is reacted with about 15.4 parts of diethyl hydrogen phosphate in about 50 parts of benzene at reflux temperature for about 2.5 hours. The solvent is then removed at about 80° C. at 21 mm. Hg for about 2.5 hours. A white opaque, viscous liquid is obtained which is identified as dibutylmethoxy(diethylphosphato)stannane.

EXAMPLE 4

In accordance with the procedure described in Example 1, approximately 49 parts of dioctyldibutoxystannane in about 100 parts of toluene is reacted with about 15.3 parts of diethyl hydrogen phosphate in about 25 parts of toluene at reflux temperature for about 2.5 hours. Volatile ingredients are removed under vacuum yielding a product which is identified as dioctylbutoxy(diethylphosphato)stannane.

EXAMPLE 5

Approximately 41.8 parts of diphenyldibutoxystannane in about 100 parts of toluene is reacted with about 15.3 parts of diethyl hydrogen phosphate in about 25 parts of toluene at reflux temperature for about 2 hours. After removing the solvent under vacuum distillation, a reaction product is recovered which is identified as diphenylbutoxy-(diethylphosphato)stannane.

EXAMPLE 6

Approximately 24.8 parts of butyldimethoxychlorostannane in about 100 parts of toluene is reacted with about 21 parts of dibutyl hydrogen phosphate in about 30 parts of toluene in accordance with the procedure described in Example 1. The solvent is removed under vacuum distillation and a product is recovered which is identified as butylmethoxy(dibutylphosphato)chlorostannane.

EXAMPLE 7

Approximately 26.9 parts of butyltrimethoxystannane in about 75 parts of toluene is reacted with about 25 parts of dimethyl hydrogen phosphate in about 50 parts of toluene in accordance with the procedure described in Example 1. The solvent is removed under vacuum distillation and a product is recovered which is identified as butylmethoxybis(dimethylphosphato)stannane.

EXAMPLE 8

Approximately 46.5 parts of octadecyltrimethoxystannane in about 120 parts of toluene is reacted with about 25 parts of dimethyl hydrogen phosphate in about 50 parts of toluene in accordance with the procedure described in Example 1. The solvent is removed by vacuum distillation and a residual product is recovered which is identified as octadecylbis(dimethylphosphato)methoxystannane.

EXAMPLE 9

Approximately 49.1 parts of dibutyldioctyloxystannane in about 150 parts of toluene is reacted with about 26.5 parts of dihexyl hydrogen phosphate in about 50 parts of toluene in accordance with the procedure described in Example 1. The solvent is removed under vacuum distillation and a residual product is recovered which is identified as dibutyloctyloxy(dihexylphosphato)stannane.

EXAMPLE 10

Approximately 41.1 parts of dibutyldibutoxystannane in about 100 parts of benzene is reacted with about 25 parts of diphenyl hydrogen phosphate in about 50 parts of benzene in accordance with the procedure described in Example 1. The solvent is removed by vacuum distillation and a residual product is recovered which is identified as dibutylbutoxy(diphenylphosphato)stannane.

EXAMPLE 11

Approximately 23.9 parts of dimethyldiethoxystannane in about 75 parts of toluene is reacted with about 32.3 parts of dioctyl hydrogen phosphate in about 75 parts of toluene in accordance with the procedure described in Example 1. The solvent is recovered by vacuum distillation and a residual product is recovered which is identified as dimethylethoxy(dioctylphosphato)stannane.

EXAMPLE 12

Approximately 25.9 parts of methyldiethoxychlorostannane in about 75 parts of toluene is reacted with about 30.8 parts of diethyl hydrogen phosphate in about 50 parts of toluene in accordance with the procedure described in Example 1. The solvent is removed by vacuum distillation and a residual product is recovered which is identified as methylbis(diethylphosphato)chlorostannane.

EXAMPLE 13

Approximately 30.8 parts of diethyl hydrogen phosphate in about 50 parts of toluene is reacted with about 30.9 parts of dibutylethoxymethoxystannane in about 100 parts of toluene in accordance with the procedure described in Example 1. The solvent is removed by vacuum distillation and a residual product is recovered which is identified as dibutylbis(diethylphosphato)stannane.

EXAMPLE 14

About 30.8 parts of dethyl hydrogen phosphate in about 50 parts of toluene is reacted with about 34.5 parts of benzyltriethoxystannane in about 100 parts of toluene in accordance with the procedure described in Example 1. The solvent is removed by vacuum distillation and a residual product is recovered which is identified as benzylethoxybis(diethylphosphato)stannane.

EXAMPLE 15

About 30.9 parts of 2-butenyltriethoxystannane in about 100 parts of toluene is reacted with about 30.8 parts of diethyl hydrogen phosphate in about 50 parts of toluene in accordance with the procedure described in Example 1. The solvent is removed by vacuum distillation and a residual product is recovered which is identified as 2-butenylbis(diethylphosphato)ethoxystannane.

EXAMPLE 16

Grafted organopolysiloxanes are prepared by reacting olefinic compounds with hydroxyl-terminated polydimethylsiloxanes in the presence of a free-radical initiator at a temperature of from about 60° to 190° C. The unreacted olefinic compounds are removed at an elevated temperature by applying a vacuum of 1 mm. Hg or less while continuing to agitate for an additional hour. The pertinent data is illustrated in Table I.

TABLE I

| Example No. | Olefinic compounds | | Hydroxylated fluid | | Free-radical initiator | | Reaction conditions | | Final polymer, viscosity, cs. |
|---|---|---|---|---|---|---|---|---|---|
| | Type | Parts | Viscosity, cs. | Parts | Type | Parts | Temp., °C. | Time, hr. | |
| 16(a) | Acrylonitrile / Butyl acrylate | 14.6 / 35.4 | 1,900 | 50 | t-BP | 0.5 | 80 | 1.5 | 14,000 |
| 16(b) | Acrylonitrile / Butyl acrylate | 9.0 / 51.0 | 800 | 40 | t-BP | 0.5 | 80 | 1.7 | 7,800 |
| 16(c) | Acrylonitrile / Ethyl acrylate / Butyl acrylate | 9.1 / 2.9 / 48.0 | 800 | 40 | t-BP | 0.25 | 80 | 2.0 | 20,200 |
| 16(d) | Methylacrylate | 50.0 | 400 | 50 | t-BP | 0.5 | 80 | 4.0 | 15,500 |
| 16(e) | Lauryl methacrylate | 70.0 | 400 | 30 | t-BP | 0.5 | 80 | 5.0 | 19,400 |
| 16(f) | Styrene / Butyl acrylate | 250.0 / 204.0 | 610 | 304 | t-BP | 2.0 | 125 | 24.0 | 14,500 |
| 16(g) | Vinyl chloride | 45.0 | 6,700 | 350 | t-BPer | 1.8 | 80 | 4.0 | 17,800 |

NOTE.—t-BP = t-butyl peroxide; t-BPer = t-butyl peroctoate.

EXAMPLE 17

A reactor containing about 31 parts of the modified hydroxyl-terminated organopolysiloxane prepared in accordance with the procedure described in Example 16(a) is evacuated for about 10 minutes and about 3 parts of ethyl silicate "40" is added with agitation. About 0.05 part of the tin catalyst prepared in accordance with Example 1 is added and the product placed in a mold and cured at room temperature. It cured to a tack-free condition in about 1 hour.

In a similar experiment, about 10 parts of Cab-O-Sil is mixed with the above composition and placed in a mold to cure at room temperature. Again, the composition cured to a tack-free condition in about 1.2 hours.

In another experiment, polydimethylsiloxane having a viscosity of about 2000 cs. is substituted for the modified organopolysiloxane in the above example. A product cured to a tack-free condition in about 1.3 hours.

EXAMPLE 18

About 31 parts of modified organopolysiloxane prepared in accordance with the procedure described in Example 16(b) is mixed with about 3 parts of methyltriacetoxysilane and about 0.01 part of the tin compound prepared in accordance with the procedure described in Example 1. The product is placed in a mold and cured at room temperature. It cured to a tack-free condition in about 0.05 hour.

In a similar experiment, a polydimethylsiloxane having a viscosity of about 2000 cs. is substituted for the modified organopolysiloxane in the above example. Again, the product cured to a tack-free condition in about 0.07 hour.

EXAMPLE 19

About 31 parts of a modified organopolysiloxane prepared in accordance with the procedure described in Example 16(f) is mixed with about 3 parts of methyltriacetoxysilane and about 0.01 parts of the tin compound prepared in Example 1. The product is placed in a mold and cured at room temperature. It cured to a tack-free condition in about 0.5 hour.

In a similar experiment, polymethylsiloxane having a viscosity of about 2000 cs. is substituted for the modified organopolysiloxane in the above example. The product again cured to a tack-free condition in about 0.5 hour.

EXAMPLE 20

In accordance with the procedure described in Example 18, the modified organopolysiloxane prepared in accordance with Example 16(b) and methoxytriacetoxysilane are substituted for methyltriacetoxysilane. The product cured at room temperature to a tack-free condition in about 0.08 hour.

In a similar experiment, a polydimethylsiloxane having a viscosity of 2000 cs. is substituted for the modified organopolysiloxane in the above example. The product cured to a tack-free condition in about 0.1 hour.

EXAMPLE 21

About 31 parts of a modified organopolysiloxane prepared in accordance with the procedure described in Example 16(f) is mixed with about 3 parts of methyltris (diethylphosphato)silane and about 0.01 part of the tin compound prepared in accordance with the procedure described in Example 1. The product is placed in a mold and cured at room temperature to a tack-free condition in about 1.8 hours.

In a similar experiment, a polydimethylsiloxane having a viscosity of about 2000 cs. is substituted for the modified organopolysiloxane of the above example. Again, the product cured at room temperature to a tack-free condition in about 2.0 hours.

EXAMPLES 22 THROUGH 42

In accordance with the procedure described in Example 17, organopolysiloxanes are reacted with various cross-linking agents in the presence of the catalysts prepared in Examples 1, 2, and 15 cured in ambient moisture at room temperature. The results of these experiments are illustrated in Table II.

ing recurring structural units selected from the class consisting of:

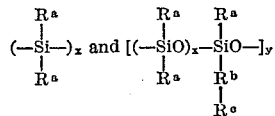

in which $R^a$ is selected from the group consisting of monovalent hydrocarbon radicals, halogenated monovalent hydrocarbon radicals, and cyanoalkyl radicals; $R^b$ is a divalent hydrocarbon radical; $R^c$ is a polymeric side chain linked to $R^b$ by a carbon-to-carbon linkage; said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles, Z is selected from the class consisting of hydroxyl groups and groups hydrolyzable by ambient moisture: $t$ is an integer greater than 2; $x$ is an integer of from 0 to 20,000; and $y$ is an integer of from

TABLE II

| Example No. | Cross-linking agent Type | Parts | OH-polysiloxane Ex. No. | Parts | Filler Type | Parts | Catalyst Ex. No. | Parts | Cures time, hours |
|---|---|---|---|---|---|---|---|---|---|
| 22 | ES "40" | 3 | 16(a) | 31 | | | | | ∞ |
| 23 | ES "40" | 3 | 16(a) | 31 | | | DBT DL | 0.05 | 3.00 |
| 24 | ES "40" | 3 | 16(a) | 31 | | | 1 | 0.05 | 1.20 |
| 25 | ES "40" | 3 | PMS | 30 | Cab-O-Sil | 3 | 2 | 0.20 | 4.00 |
| 26 | ES "40" | 3 | 16(f) | 31 | | | 3 | 0.20 | 0.50 |
| 27 | ES "40" | 3 | 16(f) | 31 | | | 4 | 0.20 | 5.00 |
| 28 | ES "40" | 3 | 16(f) | 31 | | | *5 | 0.20 | 3.00 |
| 29 | ES "40" | 3 | 16(f) | 31 | | | 6 | 0.20 | 0.30 |
| 30 | ES "40" | 3 | PMS | 31 | | | {1 / {2 | 0.02 / 0.02 | 1.60 |
| 31 | MTAS | 3 | PMS | 31 | | | | | 0.25 |
| 32 | MTAS | 3 | PMS | 31 | | | 7 | 0.05 | 0.12 |
| 33 | ES "40" | 3 | 16(c) | 31 | | | 11 | 0.20 | 2.00 |
| 34 | MTOS | 3 | 16(e) | 31 | | | | | 7.00 |
| 35 | MTOS | 3 | 16(e) | 31 | | | 13 | 0.20 | 4.00 |
| 36 | MTPS | 3 | PMS | 31 | | | | | 2.20 |
| 37 | MTPS | 3 | PMS | 31 | | | 14 | 0.20 | 1.50 |
| 38 | MTOS | 3 | 16(g) | 31 | | | | | 7.00 |
| 39 | MTOS | 3 | 16(g) | 31 | | | 15 | 0.20 | 3.20 |
| 40 | ES "40" | 3 | 16(c) | 31 | | | 15 | 0.20 | 8.00 |
| 41 | ES "40" | 3 | PMS | 31 | Cab-O-Sil | 5 | 13 | 0.20 | 5.50 |
| 42 | ES "40" | 3 | PMS | 31 | | | 12 | 0.20 | 1.30 |

NOTE:
ES "40"=ethyl silicate "40".
DBT DL=dibutyltin dilaurate.
PMS=polydimethylsiloxane (2000 cs.).
MTAS=methyltriacetoxysilane.
MTPS=methyltris(diethylphosphato)silane.
MTOS=methyltris(acetoximo)silane.
*=carbon tetrachloride (20 parts).

When the above examples are repeated utilizing other cross-linking agents which other phosphatostannane catalysts, elastomeric materials are obtained which have properties substantially equivalent to those of the specified examples.

Although specific examples have been described herein, other variations and modifications falling within the spirit and scope of the appended claims are to be included therein.

What is claimed is:

1. A curable composition comprising an organopolysiloxane represented by the formula:

wherein $R'''$ is selected from the group consisting of monovalent hydrocarbon radicals, halogenated monovalent hydrocarbon radicals, and cyanoalkyl radicals; Q represents a substantially linear organopolysiloxane hav- 1 to 500 and a catalytic amount of a phosphatostannane of the formula:

wherein Y is selected from the group consisting of halogen, $OR''$, and $$O\overset{\|}{P}(OR')_2$$

R and $R'$ are selected from the class consisting of hydrocarbon and halo-substituted hydrocarbon groups; $R''$ is selected from the group consisting of alkyl and aryl radicals; $m$ is an integer of from 0 to 2; $n$ is an integer greater than 0; and the sum of $m$ and $n$ is less than 4.

2. The composition of claim 1 wherein Q represents an organopolysiloxane of the formula:

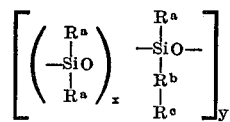

in which $R^a$ is selected from the group consisting of monovalent hydrocarbon radicals, halogenated monovalent hydrocarbon radicals, and cyanoalkyl radicals; $R^b$ is a divalent hydrocarbon radical; $R^c$ is a polymeric side chain linked to $R^b$ by a carbon-to-carbon linkage; said polymeric group being constituted of recurring units derived from monomers containing ethylenic unsaturation, said monomers being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles; $x$ is an integer of from 0 to 20,000; and $y$ is an integer of from 1 to 500.

3. The composition of claim 1 which contains at least 0.05 percent by weight of a phosphatostannane based on the weight of the composition.

4. The composition of claim 1 wherein the hydrolyzable groups are selected from the class consisting of carboxy groups, carboxy groups, oximo groups, aminooxy groups, and phosphato groups.

5. The composition of claim 1 wherein Z is a hydroxyl group and $t$ is an integer greater than 0 and less than 3.

6. The composition of claim 4 in which Z is a carbonoxy group.

7. The composition of claim 5 which contains a crosslinking agent selected from the class consisting of polyalkoxysilanes and polyalkoxysiloxanes.

8. The composition of claim 4 which is curable to an elastomeric state when exposed to moisture.

9. The composition of claim 1 wherein the curable organopolysiloxane contains a filler.

10. The composition of claim 1 wherein the curable organopolysiloxane is dissolved in an inert organic solvent.

References Cited
UNITED STATES PATENTS

| | | | |
|---|---|---|---|
| 3,127,363 | 3/1964 | Nitzche et al. | 260—46.5 |
| 3,441,537 | 4/1969 | Lengnick | 260—46.5 |

SAMUEL H. BLECH, Primary Examiner

U.S. Cl. X.R.

260—33.2, 33.6, 33.8, 37, 41, 46.5, 429.7, 827

UNITED STATES PATENT OFFICE
CERTIFICATE OF CORRECTION

Patent No. 3,525,778                     Dated August 25, 1970

Inventor(s) Guenther Fritz Lengnick

It is certified that error appears in the above-identified patent and that said Letters Patent are hereby corrected as shown below:

Column 9, line 32, "recovered" should read -- removed --. Column 10, line 59, "triacetoxysilane" should read -- triacetoximosilane --; line 63, "polymethylsiloxane" should read -- polydimethylsiloxane --. Columns 11 and 12, Table II, "Cures" should read -- Cure --. Column 12, line 25, "moisture:" should read -- moisture; --. Column 13, line 21, "carboxy" should read -- carbonoxy --.

Signed and sealed this 20th day of April 1971.

(SEAL)
Attest:

EDWARD M. FLETCHER, JR.                    WILLIAM E. SCHUYLER, JR.
Attesting Officer                          Commissioner of Patents